E. P. H. Capron,
Road Scraper,
Nº 78,054. Patented May.19,1868
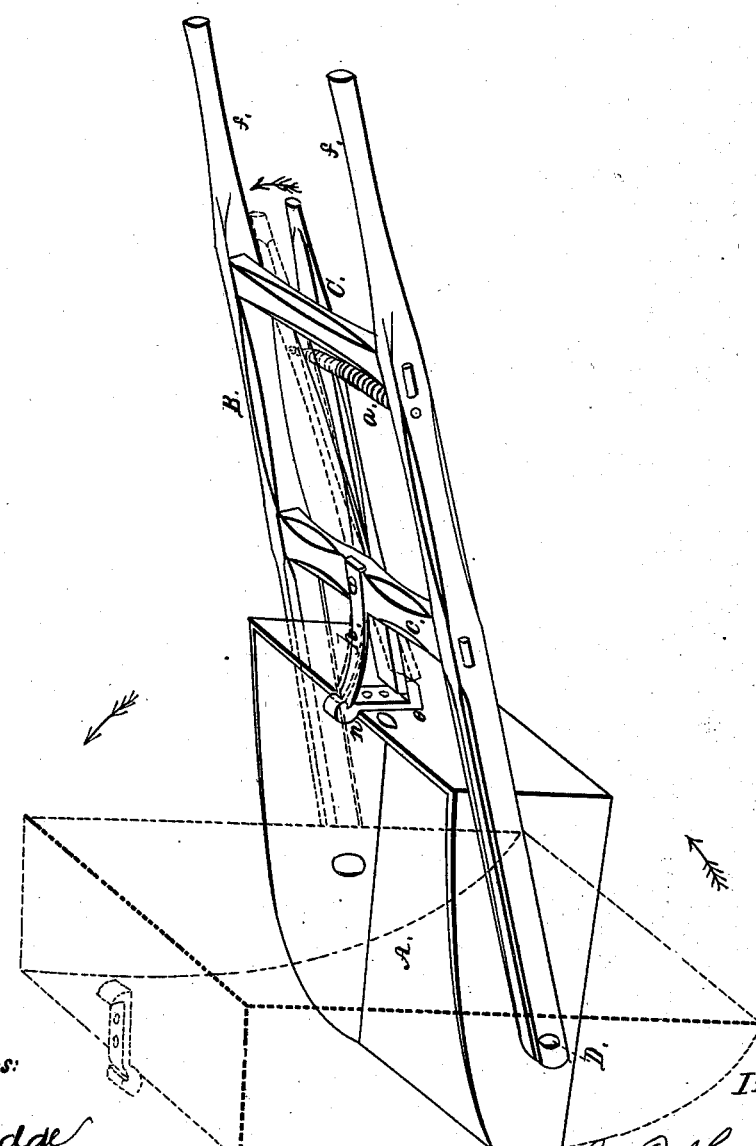
Witnesses:
P. T. Dodge
L. Haiter
Inventor:
E. P. H. Capron
by Dodge & Munn Atty

United States Patent Office.

E. P. H. CAPRON, OF SPRINGFIELD, OHIO.

*Letters Patent No. 78,054, dated May 19, 1868.*

---

IMPROVED ROAD-SCRAPER.

---

The Schedule referred to in these Letters Patent and making part of the same.

---

TO ALL WHOM IT MAY CONCERN:

Be it known that I, E. P. H. CAPRON, of Springfield, in the county of Clark, and State of Ohio, have invented certain new and useful Improvements in Road-Scrapers; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

In the drawing accompanying, my machine is shown in perspective, in position to begin work.

A is the scraper or shovel.

B is the frame, to which the scraper is attached.

C is a lever to hold the scraper in position until ready to dump the load.

Besides which there are numerous minor parts to be described hereafter.

In building my machine, I first construct the scraper or shovel A of the proper size, and of the usual form, having on each side a trunnion, D, placed a little more than half way from the rear to the front end of the scraper. This scraper I mount in a frame, B, which has an arm extending down on each side of the scraper, and in the forward end of which the trunnions D have bearing, and on which the scraper A is free to revolve when not locked in position, the rear ends of the pieces forming the arms being shaped into handles $ff$, as shown, to be grasped by the operator, to manage the scraper.

To hold the scraper in position while being filled, I attach rigidly to the back end of the scraper, at the middle, a plate or bar, o, having a projection, e, at its lower end, and a notch, n, in its rear face, near its upper end, as shown in the drawing; and to the under side of the cross-bar c, I pivot a lever, C, the forward end of which engages over the projection e of stop O, which is held there by means of a spiral spring, a, at the opposite end, thus preventing the scraper from revolving when its front edge meets with any resistance.

To the upper side of bar c, near the scraper, I attach a pawl, h, which falls into the notch n in the upper end of O, thus locking the frame B rigidly to the scraper.

The horse or other animal used to draw the scraper is attached in the usual manner, by means of rods or chains attached to each trunnion, or to the frame, and meeting forward of the machine.

The operation of my apparatus is as follows:

The horse being attached, and the operator having hold of the handles, the scraper is run forward until filled, more or less, as desired; the handles are then raised, which also raises the rear end of the scraper, through the medium of pawl h, when the forward end will take hold in the ground. The lever C is then drawn to one side, bringing its forward end from over the projection e. The scraper will then revolve on the trunnions, as shown in red lines, and thus dump the load, the lever C being drawn back by the spring as soon as released.

After dumping the load, the scraper will continue in its revolution, and come back to its original position, when the projection e will strike against the under side of lever C, and prevent a second rotation, the pawl c at the same time falling into place, thus locking the scraper in position, ready for operation again.

By thus having the stop in the middle of the scraper, I prevent the great side strain so common to those having the stop on one side, which tends greatly to twist and weaken the frame.

By this arrangement of devices, I am enabled to make a very simple and efficient scraper, and one which is superior to those heretofore made.

Having thus described my invention, what I claim, is—

The combination of the scraper A, provided with the plate O, having the stop e and notch n, with the frame B, provided with the lever C and pawl h, all constructed and arranged to operate as shown and described.

E. P. H. CAPRON.

Witnesses:
J. K. MOWER,
GEO. MOWER.